United States Patent
Lang et al.

(10) Patent No.: US 12,179,857 B2
(45) Date of Patent: Dec. 31, 2024

(54) POWER STEERING MECHANISM FOR A VEHICLE

(71) Applicant: KNORR-BREMSE Systeme fuer Nutzfahrzeuge GmbH, Munich (DE)

(72) Inventors: Rainer Lang, Schwaebisch Gmuend (DE); Bernhard Miller, Weil der Stadt (DE); Klaus Peterreins, Filderstadt (DE); Falk Hecker, Markgroeningen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 636 days.

(21) Appl. No.: 17/440,462

(22) PCT Filed: Jan. 30, 2020

(86) PCT No.: PCT/EP2020/052205
§ 371 (c)(1),
(2) Date: Sep. 17, 2021

(87) PCT Pub. No.: WO2020/187476
PCT Pub. Date: Sep. 24, 2020

(65) Prior Publication Data
US 2022/0153341 A1    May 19, 2022

(30) Foreign Application Priority Data
Mar. 18, 2019  (DE) .................... 20 2019 101 522.5

(51) Int. Cl.
*B62D 5/06* (2006.01)
*B62D 1/20* (2006.01)
(Continued)

(52) U.S. Cl.
CPC ............... *B62D 5/064* (2013.01); *B62D 1/20* (2013.01); *B62D 5/24* (2013.01); *B62D 6/08* (2013.01);
(Continued)

(58) Field of Classification Search
CPC . B62D 1/20; B62D 5/064; B62D 5/24; B62D 6/08; H02K 26/00; H02K 7/006; H02K 7/116; H02K 11/24
(Continued)

(56) References Cited

U.S. PATENT DOCUMENTS 4,232,585 A * 11/1980 Shea ........................ B62D 5/08
137/542
4,247,267 A *  1/1981 Lindtveit ................ F04C 14/04
418/32
(Continued)

FOREIGN PATENT DOCUMENTS

| CN | 1251556 A | 4/2000 |
|---|---|---|
| CN | 102887168 A | 1/2013 |

(Continued)

OTHER PUBLICATIONS

International Search Report (PCT/ISA/210) issued in PCT Application No. PCT/EP2020/052205 dated Apr. 20, 2020 with English translation (four (4) pages).
(Continued)

*Primary Examiner* — Kevin Hurley
*Assistant Examiner* — Felicia L. Brittman-Alabi
(74) *Attorney, Agent, or Firm* — Crowell & Moring LLP (57) ABSTRACT

A steering assistance device includes an input shaft, a torque sensor, and output shaft, a gear unit, a steering housing, and a drive unit. The drive unit and the torque sensor are arranged so as to be in mechanical contact with the steering housing. The drive unit has a pump for conveying the
(Continued)

working medium and a motor for driving the pump. The drive unit has a reservoir for containing working medium, wherein at least the pump is arranged within the reservoir. The input shaft, the torque sensor, the gear unit, and the drive unit are arranged in a row along a longitudinal axis.

11 Claims, 5 Drawing Sheets

(51) Int. Cl.
    *B62D 5/24*     (2006.01)
    *B62D 6/08*     (2006.01)
    *H02K 7/00*     (2006.01)
    *H02K 7/116*     (2006.01)
    *H02K 11/24*     (2016.01)
    *H02K 26/00*     (2006.01)

(52) U.S. Cl.
    CPC ............ *H02K 7/006* (2013.01); *H02K 7/116* (2013.01); *H02K 11/24* (2016.01); *H02K 26/00* (2013.01)

(58) Field of Classification Search
    USPC ........................................................ 180/417
    See application file for complete search history.

(56) References Cited

U.S. PATENT DOCUMENTS

| | | | |
|---|---|---|---|
| 6,230,839 | B1 | 5/2001 | Elser et al. |
| 6,419,042 | B1 | 7/2002 | Stenstrom |
| 6,474,437 | B1 | 11/2002 | Elser et al. |
| 2013/0015013 | A1 | 1/2013 | Sunaga et al. |
| 2014/0012470 | A1 | 1/2014 | Kim et al. |
| 2015/0291209 | A1 | 10/2015 | Haegele et al. |

FOREIGN PATENT DOCUMENTS

| | | |
|---|---|---|
| CN | 103523076 A | 1/2014 |
| CN | 104884335 A | 9/2015 |
| DE | 198 29 531 A1 | 1/2000 |
| DE | 102014117301 A1 * | 6/2016 |
| DE | 10 2015 222 864 A1 | 5/2017 |
| JP | 2002-519245 A | 7/2002 |
| JP | 2012-61949 A | 3/2012 |
| WO | WO 02/28673 A1 | 4/2002 |
| WO | WO 2016/083067 A1 | 6/2016 |
| WO | WO 2018/050568 A1 | 3/2018 |

OTHER PUBLICATIONS

German-language Written Opinion (PCT/ISA/237) issued in PCT Application No. PCT/EP2020/052205 dated Apr. 20, 2020 (five (5) pages).
Chinese-language Office Action issued in Chinese Application No. 202080022156.3 dated Dec. 6, 2022 with English translation (15 pages).
English translation of document B6 (Jp 2012-61949 A filed on Nov. 28, 2022 (20 pages)).
International Preliminary Report on Patentability (PCT/IB/326 & PCT/IB/373) issued in PCT Application No. PCT/EP/2020/052205 dated Sep. 30, 2021, including English translation of document C2 (German-language Written Opinion (PCT/ISA/237) filed on Sep. 17, 2021) (seven (7) pages).
Chinese-language Office Action issued in Chinese Application No. 202080022156.3 dated Jun. 26, 2023 with English translation (15 pages).
Jishu, S. Y., "Practical Hydraulic Technology", Oct. 31, 1984, pp. 144-146 (5 pages).
Japanese-language Office Action issued in Japanese Application No. 2021-556477 dated Oct. 3, 2022 with English translation (11 pages).
Chinese-language Office Action issued in Chinese Application No. 202080022156.3 dated Jan. 5, 2024 with English translation (14 pages).

* cited by examiner

POWER STEERING MECHANISM FOR A VEHICLE

BACKGROUND AND SUMMARY OF THE INVENTION

The present invention relates to a steering assistance device for a vehicle, in particular for a utility motor vehicle.

In the case of steering systems of vehicles, in particular in the case of front-axle steering systems, also referred to as power steering systems, of medium and heavy utility motor vehicles, it is for example possible for a recirculating-ball steering gear to be operated by means of an external, unidirectional hydraulic pump, normally a vane pump. A connection between the pump and the steering gear may be realized for example by means of external piping. In addition, an external oil reservoir may be required as an expansion tank. Individual components of such a steering system can thus be arranged in a distributed manner in the vehicle.

Against this background, it is the object of the present invention to provide an improved steering assistance device for a vehicle.

This object is achieved by means of a steering assistance device for a vehicle according to the independent claim.

A steering assistance device for a vehicle is presented, wherein the steering assistance device has the following features:

- an input shaft for introducing a torque from a steering column of the vehicle into the steering assistance device;
- a torque sensor, wherein the torque sensor is configured to detect the torque introduced via the input shaft and to provide a sensor signal which represents the detected torque;
- an output shaft for conducting the torque out of the steering assistance device;
- a gear unit, wherein the gear unit is configured to mechanically transmit the torque from the input shaft to the output shaft, wherein the gear unit is arranged within a steering housing; and
- a drive unit, wherein the drive unit is configured to charge the gear unit with a hydraulic working medium in a manner dependent on the sensor signal, wherein the drive unit and the torque sensor are arranged so as to be in mechanical contact with the steering housing.

The vehicle may be a utility vehicle or a utility motor vehicle, such as a heavy goods vehicle or the like. The steering assistance device may be part of a steering system of the vehicle. The steering system may have the steering column. The steering system may be an active hydraulic front-axle steering system for utility motor vehicles. The steering assistance device may be configured to assist steering processes for an axle of the vehicle. The steering assistance device may be configured to allow a hydraulically assisted conversion of a steering demand from a driver of the vehicle into steering movements of an axle or of wheels of the vehicle. The drive unit may be arranged or attached directly on or to the steering housing. The torque sensor may be arranged or attached directly on or to the steering housing. The working medium may be hydraulic oil or the like.

According to embodiments, it is possible in particular to provide a highly integrated arrangement or construction of a steering assistance device for an active hydraulic front-axle steering system for utility motor vehicles or for an active front-axle steering arrangement for medium and heavy utility vehicles. For this purpose, the steering assistance device may for example have a torque sensor instead of a valve, in particular a rotary slide valve, and the components of the steering assistance device can be arranged as a single, integrated, complete assembly. The steering assistance device can make possible a highly integrated active front-axle steering system or a highly integrated active power steering system, in particular for medium and heavy utility motor vehicles. For example, it is possible to realize an arrangement of a highly integrated active steering system or of an active power steering system while maintaining the mechanical technology of a hydraulic recirculating-ball steering gear.

Advantageously, according to embodiments, it is possible in particular for a structural space required for a steering assistance device to be reduced, and for the steering assistance device to be provided as a complete, compact and highly integrated assembly without external pipes or lines between the gear unit and the drive unit. Thus, instead of a distributed arrangement of components, it is possible to achieve a concentrated, compact arrangement of the steering assistance device in a utility motor vehicle. Owing to the integrated arrangement, it is possible to achieve cost savings owing to a reduced number of individual components or assemblies, as well as reduced installation outlay, reduced susceptibility to faults, one process of filling with working medium, pressure testing and commissioning, advantageously during the course of production, and space savings in the vehicle. Here, too, a distributed arrangement of components, such as pump, reservoir, gear unit, piping and the like, can be avoided in favor of a highly integrated, concentrated arrangement.

It is thus possible, for example, for a customer to be provided with a fully filled and tested steering system or a fully filled and tested steering assistance device, which can be installed in the vehicle by "plug & play" or in a simple and uncomplicated manner. With regard to the steering assistance device, a reduction in the number of components and thus also a reduction of a space requirement, susceptibility to faults and installation outlay can be achieved. In this case, a conventional recirculating-ball steering gear can remain largely structurally unchanged, and the drive unit can additionally be jointly integrated into a housing. As an advantageous side effect, fuel savings can be achieved, for example up to 0.5 liters per 100 kilometers.

According to one embodiment, at least the gear unit and the drive unit may be arranged within a common housing. The common housing may be the steering housing or another housing. Such an embodiment offers the advantage that a compact, space-saving and highly integrated structural form of the steering assistance device can be achieved.

The drive unit may also have a pump for conveying the working medium and a motor for driving the pump. The motor may be an electric motor. Such an embodiment offers the advantage that the drive unit and thus also the steering assistance device can be operated at least partially autonomously (as a steer-by-wire system or within the framework of autonomous driving/DAS).

The drive unit may have a reservoir for containing working medium. Here, at least the pump may be arranged within the reservoir. The reservoir may have a chamber which is enclosed by a housing and which serves for containing hydraulic oil or another working medium. The reservoir may function as an expansion tank for working medium. Such an embodiment offers the advantage that the drive unit can be implemented in a particularly space-saving and compact form. In particular, externally running fluid lines may be used between the reservoir and the pump.

Furthermore, the pump may be a bidirectional pump, in particular an internal gear pump or a crescent pump. In other words, the pump can be operated in two directions in order to convey the working medium in two different directions or cavities. Such an embodiment offers the advantage that the drive unit and the gear unit can be configured to be simple in terms of construction and reliable.

According to one embodiment, the gear unit may be arranged between the torque sensor and the drive unit. Alternatively, the drive unit may be arranged between the torque sensor and the gear unit. Such an embodiment offers the advantage that a structural space that is already available in most vehicles can be utilized. It is however thus also possible to select a most suitable arrangement or sequence of the units in a manner dependent on the type of vehicle.

In addition, the steering assistance device may have an electronics unit for controlling the drive unit in a manner dependent on the sensor signal. Here, the electronics unit may be arranged so as to be in mechanical contact with the drive unit. The electronics unit may be connected to the motor of the drive unit with signal transmission capability. Such an embodiment offers the advantage that the possibility of active external control, and thus use for DAS/ADAS functionalities, autonomous driving or electromobility, can be created without further structural measures. In particular, control of a hydraulic steering arrangement by means of a central control unit can be made possible, for example for DAS/ADAS functionalities (DAS=Driver Assistance Systems, ADAS=Advanced Driver Assistance Systems, highly developed driver assistance systems) or autonomous driving. This can be implemented cost-effectively and reliably without further additions or technical modifications, such as an additional control unit or additional drive motor in the region of the steering column or at the input shaft region.

In this case, the electronics unit may be arranged on the drive unit so as to be offset with respect to the drive unit transversely with respect to a longitudinal axis of the steering assistance device. In other words, the electronics unit can be arranged or attached bilaterally on or to the drive unit. Such an embodiment offers the advantage that the structural space required for the steering assistance device can be reduced. Alternatively, the drive unit may be arranged between the electronics unit and the gear unit. Here, the electronics unit, the drive unit and the gear unit may be arranged in a row along the longitudinal axis of the steering assistance device. Such an embodiment offers the advantage that the routing of lines for motor phases and of sensor lines, for example for the detection of motor position, temperature, pressure, etc., can be simplified.

The gear unit may also have a first working chamber, which is fluidically connected to the drive unit and which serves for containing working medium, and a second working chamber, which is fluidically connected to the drive unit and which serves for containing working medium. Here, the first working chamber may be connected to the drive unit via a first fluid line and the second working chamber may be connected to the drive unit via a second fluid line. If the first working chamber is charged with working medium by means of the drive unit, a movement of the gear unit in a first direction can be effected or assisted. If the second working chamber is charged with working medium by means of the drive unit, a movement of the gear unit in a second direction can be effected or assisted. Such an embodiment offers the advantage that simple and reliable construction and operation of the gear unit can be realized.

Furthermore, the gear unit may be designed as a ball screw drive. Here, the gear unit may have a piston with an integrated recirculating-ball arrangement and a spindle. The spindle may be connected to the input shaft via the torque sensor. The piston can be movable by working medium in the first working chamber or in the second working chamber. Such an embodiment offers the advantage that such a gear unit exhibits reduced friction, a reduced stick-slip effect and less wear.

Exemplary embodiments of the approach presented here will be discussed in more detail in the following description with reference to the figures.

DETAILED DESCRIPTION OF THE DRAWINGS

In the following description of expedient exemplary embodiments of the present approach, identical or similar reference designations are used for the elements of similar action that are illustrated in the various figures, wherein a repeated description of these elements will not be given.

Figure 1:
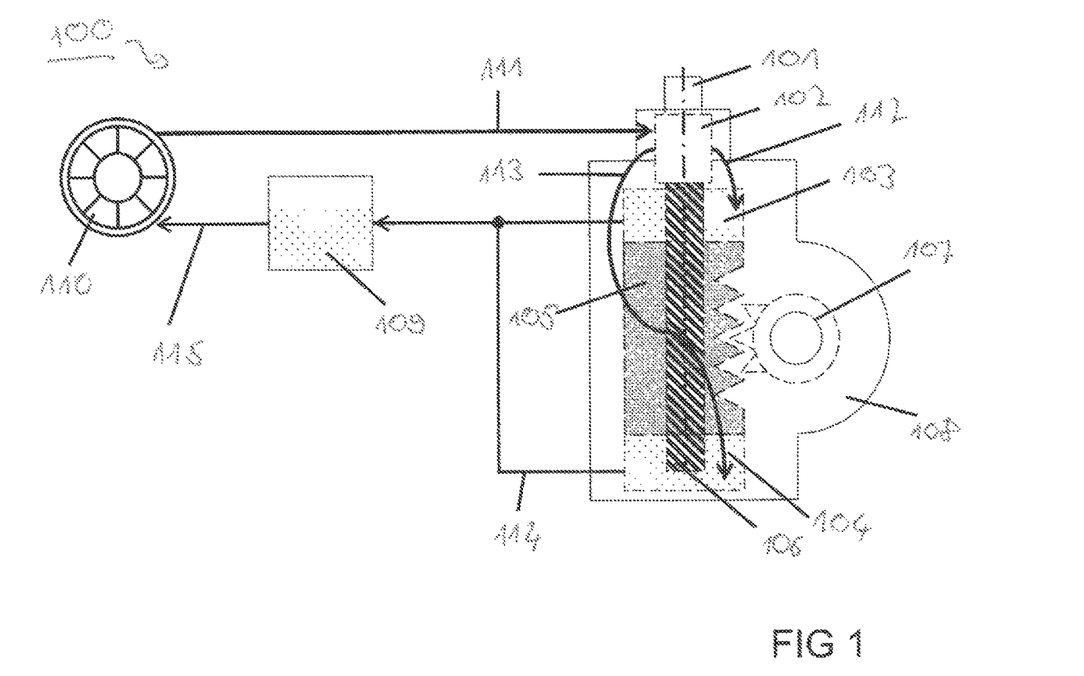
FIG. 1 is a schematic illustration of a hydraulic front-axle steering system for utility motor vehicles.

FIG. 1 is a schematic illustration of a hydraulic front-axle steering system 100 for utility motor vehicles. The front-axle steering system 100 comprises an input shaft 101 which is connected to a steering wheel via a steering column, a rotary slide valve 102 with an integrated torsion bar, an upper working chamber 103 or upper cylinder chamber 103, a lower working chamber 104 or lower cylinder chamber 104, a piston 105 arranged between the upper working chamber 103 and the lower working chamber 104, a spindle 106 mechanically connected to the input shaft 101 via the rotary slide valve 102, an output shaft 107 or segment shaft 107, a steering housing 108, an oil reservoir 109, a unidirectional pump 110, for example a vane pump, driven passively or actively by a motor, a first high-pressure line 111 in the form of piping from the pump 110 to the rotary slide valve 102 or steering valve, a second high-pressure line 112 from the rotary slide valve 102 into the upper working chamber 103, a third high-pressure line 113 from the rotary slide valve 102 into the lower working chamber 104, a first low-pressure line 114 in the form of piping from the working chambers 103 and 104 into the oil reservoir 109, and a second low-pressure line 115 from the oil reservoir 109 to an inlet region of the pump 110.

The pump 110 is normally driven by an internal combustion engine and is flange-mounted thereon, wherein the steering arrangement is normally seated on the frame under the driver, wherein the oil reservoir 109 or an expansion tank is arranged somewhere in between, and wherein a connection of the components is realized by means of piping.

Figure 2:
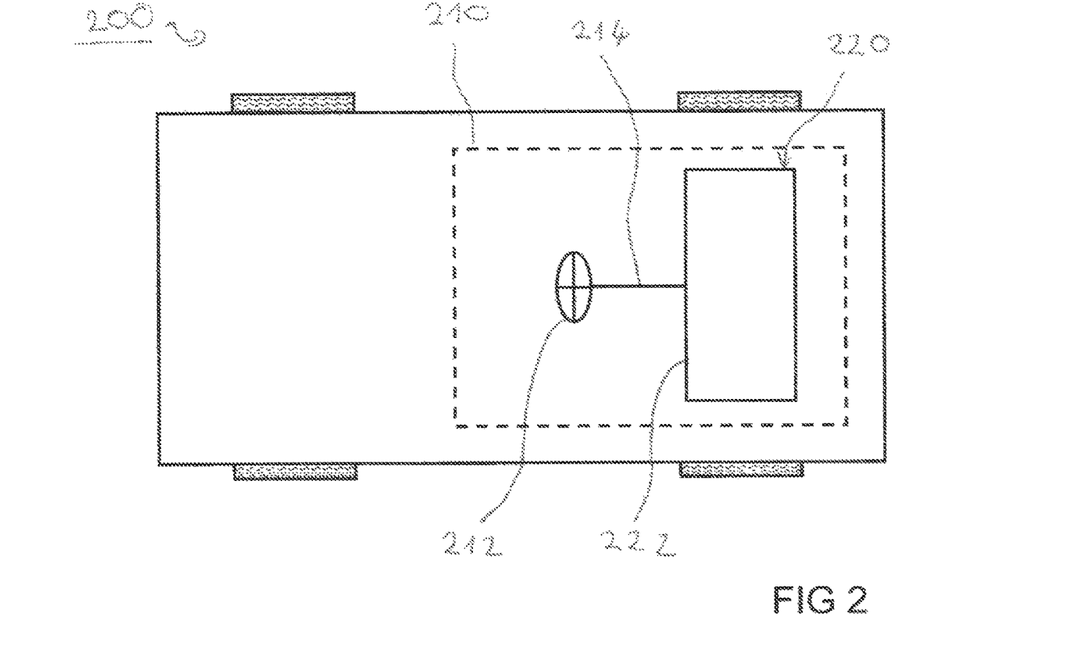
FIG. 2 is a schematic illustration of a vehicle with a steering system with a steering assistance device according to an exemplary embodiment.

FIG. 2 is a schematic illustration of a vehicle 200 with a steering system 210 with a steering assistance device 220 according to an exemplary embodiment. The steering system 110 is arranged in the vehicle 200. The vehicle is for example a utility vehicle or a utility motor vehicle, in particular a medium or heavy utility vehicle, for example a heavy goods vehicle or the like. The steering system 110 may be configured as a steering system for a front axle of the vehicle 200. The steering system 110 can thus also be referred to as a front-axle steering system 110.

According to the exemplary embodiment illustrated here, the steering system 110 has a steering wheel 212, a steering column 214 and the steering assistance device 220. The steering wheel 212 is mechanically coupled to the steering assistance device 220 via the steering column 214. The steering assistance device 220 has a housing 222. According to the exemplary embodiment illustrated here, components of the steering assistance device 220 are arranged within the housing 222. More specifically, only an input shaft and/or an output shaft of the steering assistance device 220 extend out of the housing 222. The steering assistance device 220 will be discussed in more detail with reference to the following figures.

Figure 3:
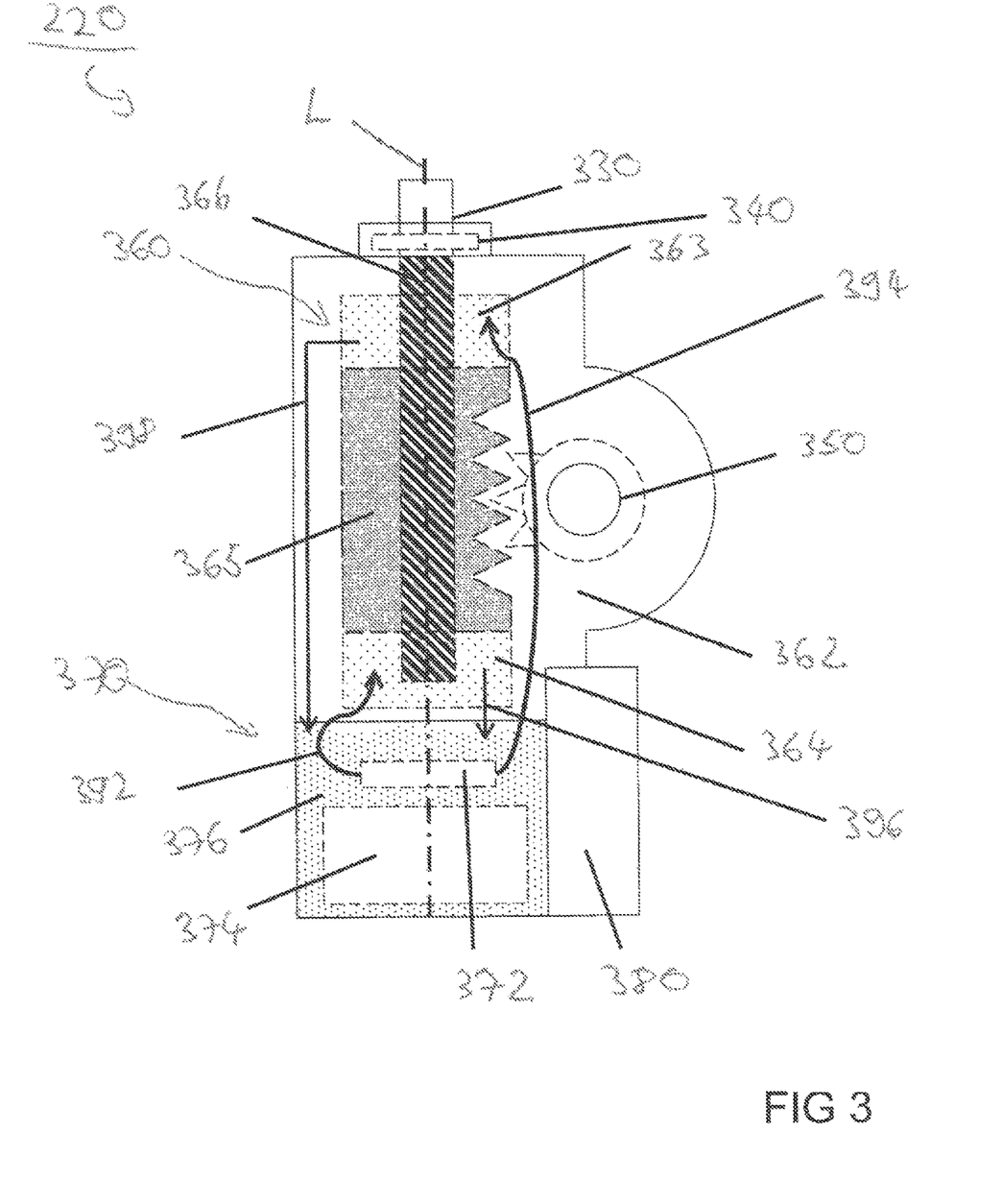
FIG. 3 is a schematic illustration of a steering assistance device according to an exemplary embodiment.

FIG. 3 is a schematic illustration of a steering assistance device 220 according to an exemplary embodiment. The steering assistance device 220 corresponds or is similar to the steering assistance device from FIG. 2. The steering assistance device 220 has an input shaft 330, a torque sensor 340, an output shaft 350, a gear unit 360 and a drive unit 370.

The input shaft 330 is configured to introduce a torque from a steering column of the vehicle, to which the input shaft 330 is connectable or connected, into the steering assistance device 220. The torque introduced via the input shaft 330 can also be referred to as an input torque. The input shaft 330 is connected or mechanically coupled to the steering wheel via the steering column of the steering system. The torque sensor 340 is configured to detect the torque introduced via the input shaft 330. Furthermore, the torque sensor 340 is configured to provide a sensor signal which represents the detected torque. The output shaft 350 is configured to conduct the torque out of the steering assistance device 220 or to output the torque to an axle or to wheels of the vehicle. The torque conducted out via the output shaft 350 can also be referred to as an output torque or an output force.

The gear unit 360 is configured to mechanically transmit the torque from the input shaft 330 to the output shaft 350. In particular, the gear unit 360 is configured to convert the input torque into the output torque. The gear unit 360 has a steering housing 362. The gear unit 360 is arranged within the steering housing 362. The drive unit 370 is configured to charge the gear unit 360 with a hydraulic working medium in a manner dependent on the sensor signal of the torque sensor 340. In other words, the drive unit 370 is configured to assist or boost a movement of the gear unit 360, or a movement within the gear unit 360, by means of the working medium in a manner dependent on the sensor signal of the torque sensor 340.

The drive unit 370 and the torque sensor 340 are arranged so as to be in mechanical contact with the steering housing 362. More specifically, the drive unit 370 and the torque sensor 340 are flange-mounted or otherwise attached directly on or to the steering housing 362. It is also additionally or alternatively the case that the drive unit 370 and the torque sensor 340 are arranged within the steering housing 362. In general terms, at least the gear unit 360 and the drive unit 370 are arranged within a common housing. Optionally, the torque sensor 340 is also arranged within the common housing. The common housing is for example the steering housing 362.

According to the exemplary embodiment illustrated here, the gear unit 360 is configured as a ball screw drive. The gear unit 360 has a first working chamber 363, which is fluidically connected to the drive unit 370 and which serves for containing working medium, a second working chamber 364, which is fluidically connected to the drive unit 370 and which serves for containing working medium, a piston 365 with integrated recirculating-ball arrangement, and a spindle 366, which via the torque sensor 340 is mechanically connected to the input shaft 330.

According to the exemplary embodiment illustrated here, the drive unit 370 has a pump 372 for conveying the working medium and a motor 374 for driving the pump 372. The motor 374 is an electric motor. The pump 372 is configured as a bidirectional pump. For example, the pump 372 is an internal gear pump, a crescent pump, or the like. Furthermore, the drive unit 370 has a reservoir 376 for containing working medium. At least the pump 372 is arranged within the reservoir 376. According to the exemplary embodiment illustrated here, the pump 372 and the motor 374 are arranged within the reservoir 376.

According to the exemplary embodiment illustrated here, the steering assistance device 220 also has an electronics unit 380 or control unit 380. The electronics unit 380 is arranged so as to be in mechanical contact with the drive unit 370. The electronics unit 380 is directly flange-mounted on, or attached in some other way to, the drive unit 370. The electronics unit 380 is configured to control the drive unit 370 in a manner dependent on the sensor signal of the torque sensor 340. More specifically, the electronics unit 380 is configured to control the motor 374 of the drive unit 370 in a manner dependent on the sensor signal. The electronics unit 380 is a microcontroller, a so-called logic board or the like. The electronics unit 380 may also represent an output stage for motor control.

With regard to the steering assistance device 220, a longitudinal axis L is also shown in FIG. 3. The input shaft 330, the spindle 366 and the piston 365 extend along the longitudinal axis L. According to the exemplary embodiment shown here, the gear unit 360 is arranged between the torque sensor 340 and the drive unit 370. Here, the input shaft 330, the torque sensor 340, the gear unit 360 and the drive unit 370 are arranged in a row along the longitudinal axis L. The electronics unit 380 is arranged on the drive unit 370 so as to be offset with respect to the drive unit 370 transversely with respect to the longitudinal axis L. The output shaft 350 is arranged so as to be offset relative to the piston 365 and the spindle 366 transversely with respect to the longitudinal axis L. The electronics unit 380 is offset in the same direction as the output shaft 350 transversely with respect to the longitudinal axis L.

The pump 372 of the drive unit 370 is fluidically connected to the second working chamber 364 of the gear unit 360 via a first high-pressure line 392. Furthermore, the pump 372 is fluidically connected to the first working chamber 363 of the gear unit 360 via a second high-pressure line 394. The second working chamber 364 of the gear unit 360 is fluidically connected to the reservoir 376 via a first low-pressure line 396. The first working chamber 363 of the gear unit 360 is fluidically connected to the reservoir 376 via a second low-pressure line 398. The high-pressure lines 392 and 394 and the low-pressure lines 396 and 398 run internally within the steering assistance device 220. The pump 372 is fluidically connected to the reservoir 376.

The drive unit 370 or a so-called power pack, including the pump 372, the motor 374 and the electronics unit 380, is installed in the vehicle in the region of a steering column lever. In most vehicles, there is structural space available in this region. The input shaft 330 is not lengthened or is only slightly lengthened in relation to conventional steering systems, such that a hitherto required structural space of a steering gear does not need to be extended or only needs to be extended to an insignificant extent. By means of a lateral arrangement of the electronics unit 380, a short structural length is achieved, and thus easy exchangeability with respect to conventional components is achieved. According to another exemplary embodiment, the electronics unit 380 may also be offset in a different direction than the output shaft 350 transversely with respect to the longitudinal axis L.

Figure 4:
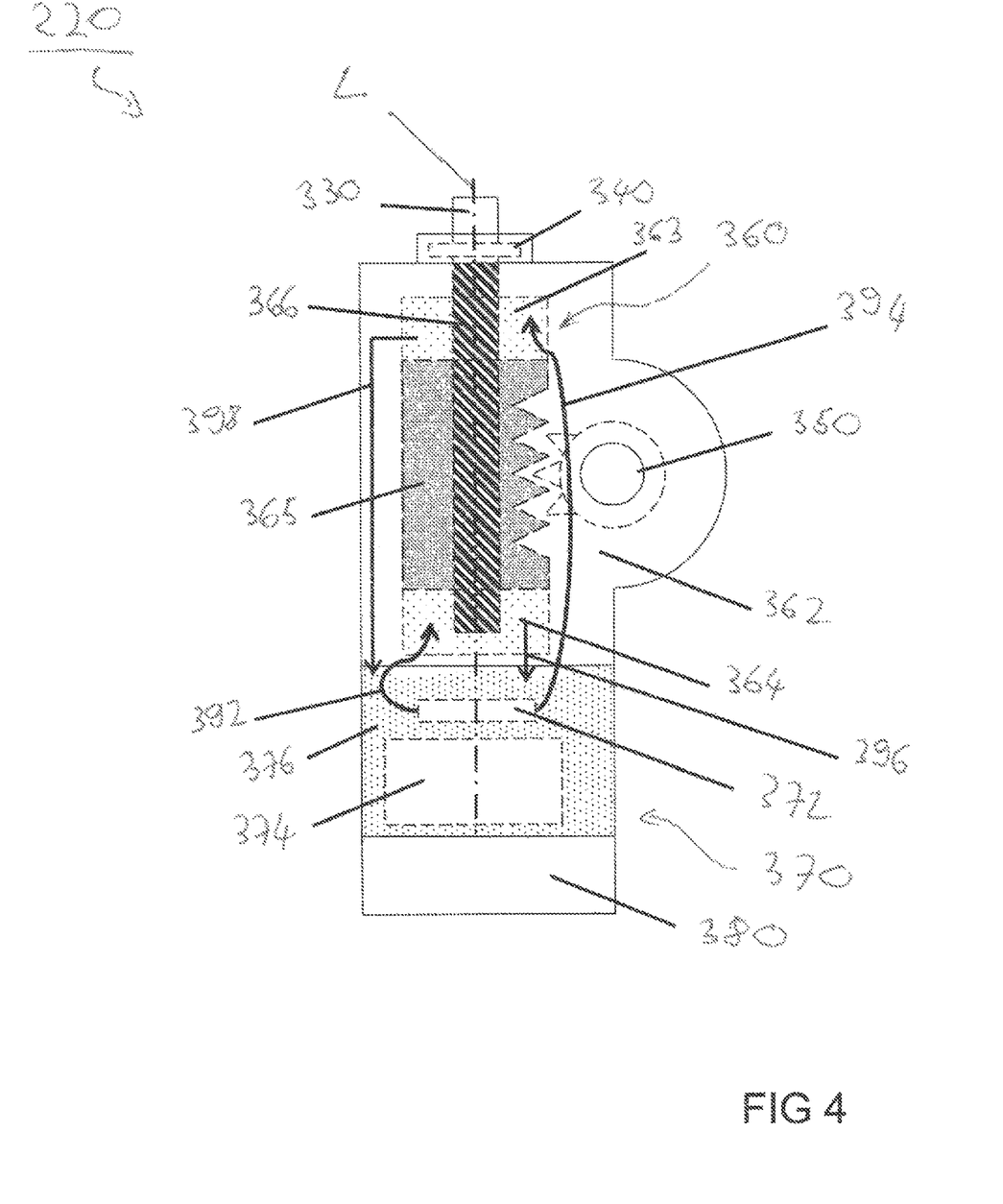
FIG. 4 is a schematic illustration of a steering assistance device according to an exemplary embodiment.

FIG. 4 is a schematic illustration of a steering assistance device 220 according to an exemplary embodiment. The steering assistance device 220 corresponds to the steering assistance device from FIG. 3 with the exception that the drive unit 370 is arranged between the electronics unit 380 and the gear unit 360, or the electronics unit 380 is arranged as an extension of the drive unit 370 axially with respect to the longitudinal axis L.

Figure 5:
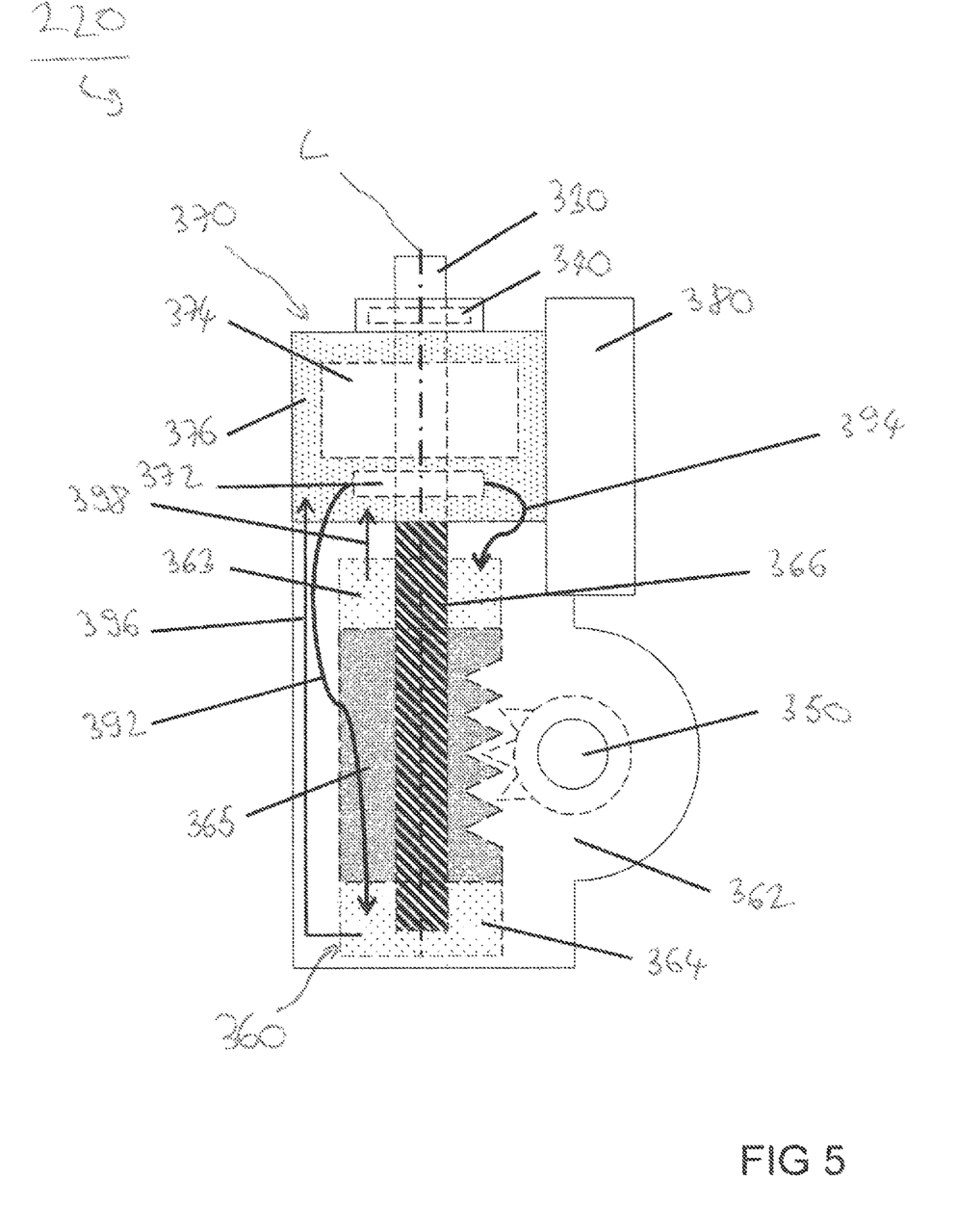
FIG. 5 is a schematic illustration of a steering assistance device according to an exemplary embodiment.

FIG. 5 is a schematic illustration of a steering assistance device 220 according to an exemplary embodiment. The steering assistance device 220 corresponds to the steering assistance device from FIG. 3 with the exception that the drive unit 370 is arranged between the torque sensor 340 and the gear unit 360. In this case, the electronics unit 380 is likewise arranged on the drive unit 370 so as to be offset with respect to the drive unit 370 transversely with respect to the longitudinal axis L.

Figure 6:
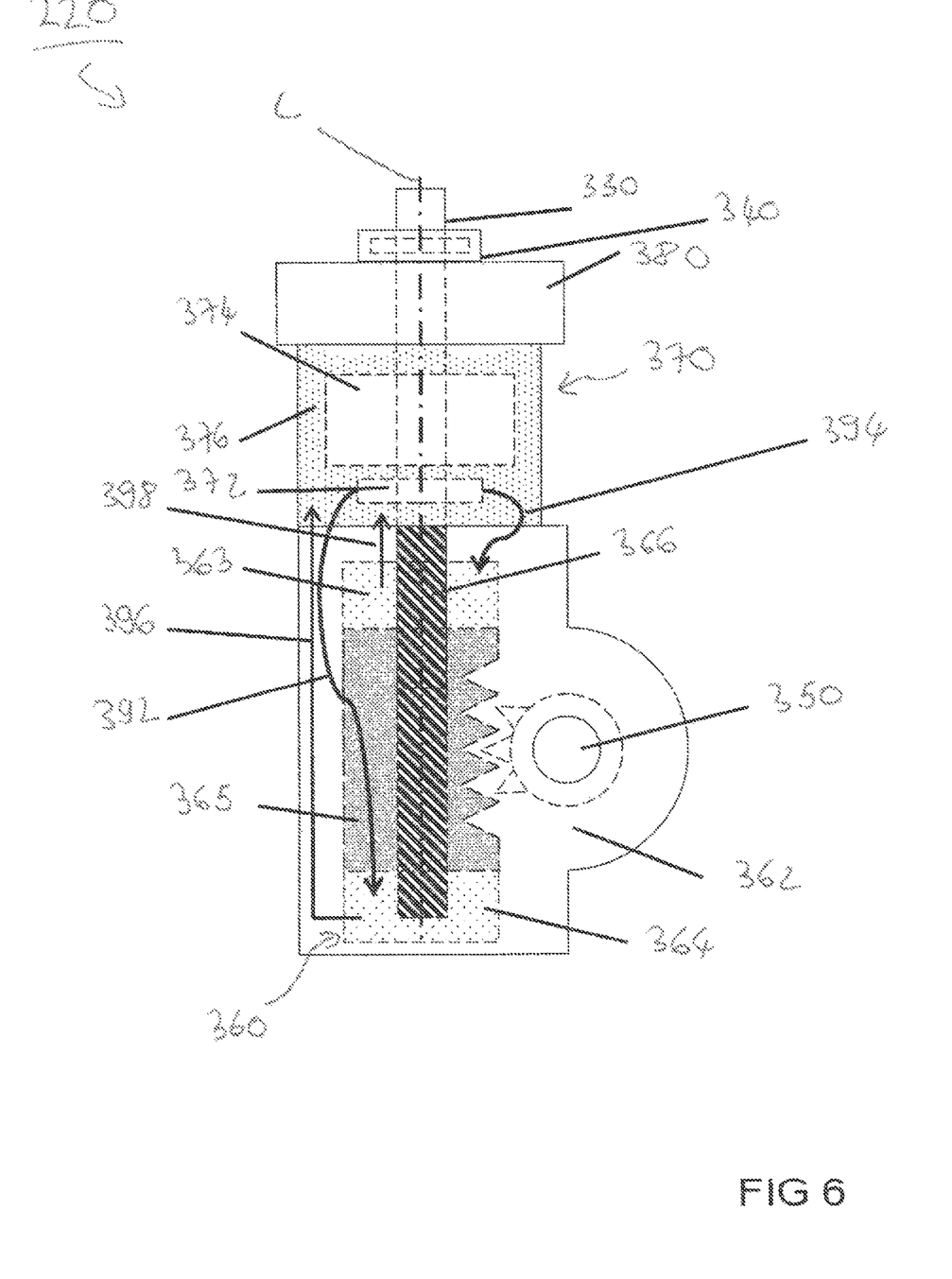
FIG. 6 is a schematic illustration of a steering assistance device according to an exemplary embodiment.

FIG. 6 is a schematic illustration of a steering assistance device 220 according to an exemplary embodiment. The steering assistance device 220 corresponds to the steering assistance device from FIG. 5 with the exception that the drive unit 370 is arranged between the electronics unit 380 and the gear unit 360, or the electronics unit 380 is arranged as an extension of the drive unit 370 axially with respect to the longitudinal axis L.

With reference to FIGS. 2 to 6, it should be noted that the following statements apply to the exemplary embodiments described therein. In relation to a common hydraulic recirculating-ball steering gear, exemplary embodiments have the torque sensor 340 instead of a hydraulic rotary slide valve. The torsion bar is maintained. In the event of a steering actuation by the driver, said torsion bar generates a differential angle, which is detected by the torque sensor 340 and is converted into a driver-imparted manual torque. In addition, according to exemplary embodiments, the drive unit 370, which has the bidirectional pump 372 and the motor 374, and the electronics unit 380 for controlling the drive unit 370, are integrated in the housing 222. Hydraulic oil as the working medium is now forced into the respective working chamber 363 or 364 by means of the pump 372, and using a suitable control algorithm, in accordance with the driver demand. The mode of operation is similar to a hydraulic gear.

If an exemplary embodiment comprises an "and/or" combination between a first feature and a second feature, this is to be read as meaning that the exemplary embodiment, according to one embodiment, has both the first feature and the second feature and, according to a further embodiment, has either only the first feature or only the second feature.

LIST OF REFERENCE DESIGNATIONS

| | |
|---|---|
| 100 | Front-axle steering system |
| 101 | Input shaft |
| 102 | Rotary slide valve |
| 103 | Upper working chamber |
| 104 | Lower working chamber |
| 105 | Piston |
| 106 | Spindle |
| 107 | Output shaft |
| 108 | Steering housing |
| 109 | Oil reservoir |
| 110 | Pump |
| 111 | First high-pressure line |
| 112 | Second high-pressure line |
| 113 | Third high-pressure line |
| 114 | First low-pressure line |
| 115 | Second low-pressure line |
| 200 | Vehicle |
| 210 | Steering system |
| 212 | Steering wheel |
| 214 | Steering column |
| 220 | Steering assistance device |
| 222 | Housing |
| 330 | Input shaft |
| 340 | Torque sensor |
| 350 | Output shaft |
| 360 | Gear unit |
| 362 | Steering housing |
| 363 | First working chamber |
| 364 | Second working chamber |
| 365 | Piston |
| 366 | Spindle |
| 370 | Drive unit |
| 372 | Pump |
| 374 | Motor |
| 376 | Reservoir |
| 380 | Electronics unit or control unit |
| 392 | First high-pressure line |
| 394 | Second high-pressure line |
| 396 | First low-pressure line |
| 398 | Second low-pressure line |
| L | Longitudinal axis |

What is claimed is:

1. A steering assistance device for a vehicle, comprising:
an input shaft for introducing a torque from a steering column of the vehicle into the steering assistance device;
a torque sensor, wherein the torque sensor is configured to detect the torque introduced via the input shaft and to provide a sensor signal which represents the detected torque;
an output shaft for conducting the torque out of the steering assistance device;
a gear unit, wherein the gear unit is configured to mechanically transmit the torque from the input shaft to the output shaft;
a steering housing, wherein the gear unit is arranged within the steering housing; and
a drive unit, wherein the drive unit is configured to charge the gear unit with a hydraulic working medium in a manner dependent on the sensor signal, wherein
the drive unit and the torque sensor are arranged so as to be in mechanical contact with the steering housing,
the drive unit has a pump for conveying the working medium and a motor for driving the pump,
the drive unit has a reservoir for containing working medium, wherein at least the pump is arranged within the reservoir, and
the input shaft, the torque sensor, the gear unit, and the drive unit are arranged in a row along a longitudinal axis.

2. The steering assistance device as claimed in claim 1, wherein
at least the gear unit and the drive unit are arranged within a common housing.

3. The steering assistance device as claimed in claim 1, wherein
the pump is a bidirectional pump.

4. The steering assistance device as claimed in claim 3, wherein
the pump is an internal gear pump or a crescent pump.

5. The steering assistance device as claimed in claim 1, wherein
the gear unit is arranged between the torque sensor and the drive unit, or the drive unit is arranged between the torque sensor and the gear unit.

6. The steering assistance device as claimed in claim 1, further comprising:
an electronics unit for controlling the drive unit in a manner dependent on the sensor signal, wherein
the electronics unit is arranged so as to be in mechanical contact with the drive unit.

7. The steering assistance device as claimed in claim 6, wherein
the electronics unit is arranged on the drive unit so as to be offset with respect to the drive unit transversely with respect to a longitudinal axis of the steering assistance device, or the drive unit is arranged between the electronics unit and the gear unit.

8. The steering assistance device as claimed in claim 1, wherein
the gear unit has a first working chamber, which is fluidically connected to the drive unit and which serves for containing working medium, and a second working chamber, which is fluidically connected to the drive unit and which serves for containing working medium.

9. The steering assistance device as claimed in claim 1, wherein
the gear unit is a ball screw drive.

10. The steering assistance device as claimed in claim 1, wherein the pump and the motor are arranged within the reservoir.

11. The steering assistance device as claimed in claim 1, wherein the pump, the motor, and the reservoir are also arranged in the row along the longitudinal axis.

\* \* \* \* \*